June 9, 1942.   F. H. MALONEY   2,285,821
TUBE COMPRESSOR DEVICE
Filed Aug. 23, 1940
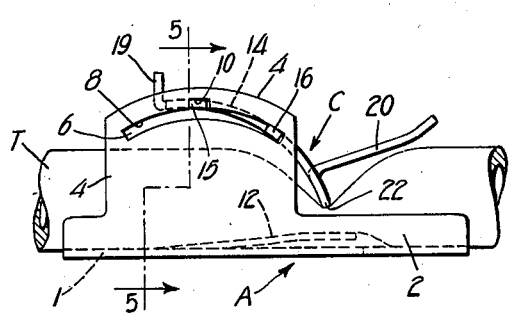
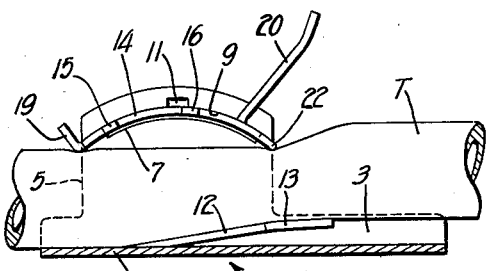
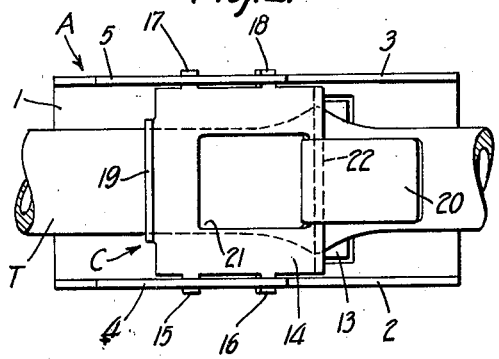
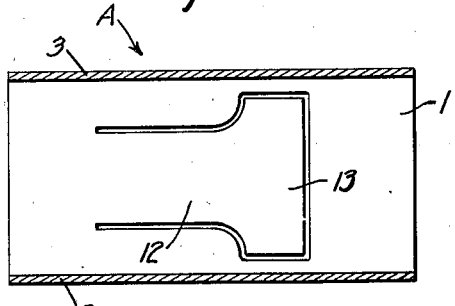
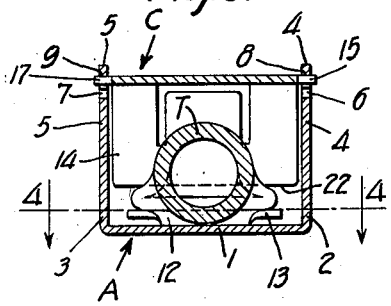
INVENTOR.
Frank H. Maloney
BY
ATTORNEYS Patented June 9, 1942

2,285,821

UNITED STATES PATENT OFFICE 2,285,821

TUBE COMPRESSOR DEVICE

Frank H. Maloney, Elmhurst, N. Y., assignor to Brass Goods Manufacturing Co., Brooklyn, N. Y., a corporation of New York Application August 23, 1940, Serial No. 353,975

2 Claims. (Cl. 251—5)

This invention relates to a device for compressing tubing, and more especially to a compressing device in the form of a clamp for compressing resilient tubing of small diameter.

An object of the invention is to provide a clamping device which is made of few parts, is economical in the use of material and may be readily manufactured.

Another object is to provide a clamping device which is made of only two parts and in which each of the parts may readily be formed of sheet metal.

A further object is to provide a clamping device which is easy to manipulate to both its closed and open positions, and which automatically becomes locked in its closed position while the tubing is being compressed.

In further pursuance of the last mentioned object, the device comprises a main clamp body portion which is provided with a curved guideway, such as a slot, in which a detent portion of a movable clamp jaw is slidable, the slot having an enlargement into which the detent portion is projected for the purpose of securing the movable jaw in its effective clamping position. The movable jaw is further provided with a thumb piece for the purpose of readily releasing the detent portion from the enlargement when it is desired to release the clamp.

Further objects of the invention will become apparent to those skilled in the art as the description thereof proceeds. For a better understanding of the invention, however, reference is made to the accompanying drawing in which:

Fig. 1 is a front view of a clamping device embodying the invention with the movable clamp jaw shown in clamping position on a section of rubber tubing;

Fig. 2 is a view similar to Fig. 1, but with the front face of the base member of the clamp broken away and removed, and the movable clamp element in its released position;

Fig. 3 is a top plan view of the device and tubing shown in Fig. 1;

Fig. 4 is a horizontal cross-section through the base member of the clamp taken on the line 4—4 of Fig. 5;

Fig. 5 is a section of the clamping device and tubing of Fig. 1 taken on the line 5—5 thereof.

In the embodiment of the invention shown, in Figs. 1-5 the clamping device is shown as comprising two members, a main body member A and a movable clamp member C. Each of these members is preferably made of sheet metal for the purpose of economy in manufacture, although it will be understood that they may be formed of other material within the scope of the invention. Body member A comprises a horizontal, flat plate 1 which is bent up at its opposite edges to provide the vertical side flanges 2, 3 which extend the entire length of plate 1. Somewhat to the left of their centers, the flanges 2, 3 are further extended to provide the brackets 4, 5, each bracket being cut away as indicated in Fig. 1 to form the arcuate slots 6, 7. The upper bounding surfaces 8, 9 of the slots 6, 7 are further cut away at their highest portions to provide the aligned recesses 10, 11. Formed centrally of plate 1 and preferably punched therefrom is a pressure receiving tongue 12 having a widened end portion 13, as shown in Fig. 4, the tongue 12 being bent upwardly at a small angle to the plane of plate 1, as shown in Fig. 3, for a purpose to be later described.

The movable clamp member C comprises a plate 14 which is curved to substantially the same curvature as the slot 6 and has a length greater than the slot 6, the width of plate 14 being somewhat less than the distance between the brackets 4, 5, as shown in Fig. 2. For the purpose of guiding clamp member C, plate 14 is provided with the ears 15, 16, 17 and 18 which project directly outward from its opposite edges into the slots 6—7 and are slidable within these slots. Forwardly of the ears 15—17, the front end of plate 14 is bent upwardly, as shown in Fig. 1, to provide a thumb piece 19 for releasing the clamp. At its rear end, plate 14 is provided with an operating handle 20 preferably formed by bending upwardly the central portion of the plate in a punching operation, reference numeral 21 denoting the aperture formed by the displacement of the material constituting the handle 20. In assembling the clamping device, the movable clamp member C is held in proper position with reference to the main body member A and the side flanges 2 and 3 are then bent upwardly into position, causing the ears 15 and 16 to enter slot 6 and the ears 17 and 18 to enter the slot 7.

In using the clamp, the tubing T to be compressed is drawn between the flanges 2—3 of body member A with the movable clamp C in its open position, as shown in Fig. 3. Handle 20 is then depressed by a finger or thumb of the operator, whereupon the rear end 22 of plate 14 thrusts the upper wall of the tubing downward until the desired closure of the tubing is effected. The pressure on handle 20 causes the end portion 22 to act as a fulcrum for plate 14 and the ears 15 and 17 to exert an upward pressure on the upper walls 8—9 of the slots 6—7 and the ears 15 and 17 to enter the recesses 10 and 11, respectively, and move upwardly into the position shown in Fig. 1. The ears 15 and 17 thus serve as detents to retain clamp member C in its closed position, the ears being maintained in this position after the operator releases handle 20 due to the upward pressure exerted by the tubing against the rear end 22 of the clamp. During the clamping operation, the pressure exerted against the tongue 13 by the lower wall of the tubing T causes it to be bent downwardly somewhat and receive a permanent set, the amount of which is dependent on the wall thickness of the tubing, the tongue thereafter projecting upwardly from the plate 1 by only a small angle, as indicated in dotted lines in Fig. 1. To release the clamp, the operator presses downwardly on thumb piece 19, and since the plate 14 acts as a lever pivoted on its end 22, in order for the detents 15 and 17 to leave the recesses 10 and 11, it is necessary for the end 22 to move rearwardly a slight amount. This motion is permitted by the resiliency of the tubing, which is usually made of a resilient rubber composition. As soon as the detents 15 and 17 leave the recesses 10—11, the upward pressure of the tubing causes clamp member C to move forwardly to the releasing position shown in Fig. 3, the detents 15—17 and ears 16—18 sliding within the slots 6—7.

I have described what I believe to be the best embodiments of my invention. I do not wish, however, to be confined to the embodiments shown, but what I desire to cover by Letters Patent is set forth in the appended claims.

I claim:

1. A device adapted to clamp tubing comprising, in combination, a base member provided with a pair of spaced apart upstanding brackets at its opposite edges and formed integral therewith, said brackets being provided with a pair of aligned arcuate guideways and the upper edge of each of said guideways being provided with a single notch, an upwardly inclined tongue of resilient material secured to the bottom of the base member between said brackets, an adjustable clamp member having oppositely disposed edge portions extending into and slidable along said guideways and having its rear end extending transversely between said brackets and arranged to engage the tubing and compress it against said tongue upon adjustment of the clamp member into its clamping position, the edge portions of the clamp member being arranged to enter said notches and retain the clamp member in tube clamping position.

2. A clamping device as set forth in claim 1 in which the clamp member is provided with an upwardly extending integrally formed thumb piece at its forward end adapted to be depressed to release the edge portions of the clamp member from the notches in the guideways.

FRANK H. MALONEY.